United States Patent
Rauhala

(10) Patent No.: US 6,611,547 B1
(45) Date of Patent: Aug. 26, 2003

(54) METHOD OF AVOIDING PACKET LOSS AT A HANDOVER IN A PACKET-BASED TELECOMMUNICATIONS NETWORK AND HANDOVER METHOD

(75) Inventor: Kristian Rauhala, San Diego, CA (US)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/402,343

(22) PCT Filed: Apr. 9, 1998

(86) PCT No.: PCT/FI98/00324
§ 371 (c)(1),
(2), (4) Date: Jan. 6, 2000

(87) PCT Pub. No.: WO98/47302
PCT Pub. Date: Oct. 22, 1998

(30) Foreign Application Priority Data

Apr. 15, 1997 (FI) .................................................. 971585

(51) Int. Cl.⁷ ............................................... H04L 12/56
(52) U.S. Cl. .................... 372/331; 370/395.1; 455/436
(58) Field of Search ............................... 370/331, 230, 370/235, 338, 401, 428, 429, 395.1; 455/436, 437, 438, 439, 440, 441, 442, 443, 412, 415

(56) References Cited

U.S. PATENT DOCUMENTS 5,940,371 A * 8/1999 Mitts et al. ................. 370/236

FOREIGN PATENT DOCUMENTS

| EP | 0 328 100 | 8/1989 |
|----|-----------|--------|
| EP | 0 616 480 | 9/1994 |
| EP | 0 660 632 | 6/1995 |
| EP | 0 777 396 | 6/1997 |
| EP | 0 798 943 | 10/1997 |
| FI | 961315 | 5/1996 |
| FI | 961038 | 9/1996 |
| GB | 2 265 278 | 9/1993 |
| GB | 2 298 765 | 9/1996 |
| WO | 95/08898 | 3/1995 |
| WO | 97/31499 | 8/1997 |

* cited by examiner

*Primary Examiner*—Ken Vanderpuye
(74) *Attorney, Agent, or Firm*—Pillsbury Winthrop LLP

(57) ABSTRACT

The invention relates to a connection-oriented packet-based communication network, in which the terminal and the network access point of the terminal may move in the network. When the access point of the terminal changes during an active connection, the routing connection can also be changed from an old access point to a new one. The old access point may comprise buffered cells, which can be transferred to the new access point without packet loss. A connection from the old access point to the new one is established dynamically, when required. The connection establishment is controlled by a third network element, which is responsible for controlling the change of access point. The old access point can be arranged to send signaling messages and to establish a connection without requiring any additional intelligence at the access point. Upon the connection being established, the old access point sends buffered unsent packets to the new access point.

15 Claims, 1 Drawing Sheet

METHOD OF AVOIDING PACKET LOSS AT A HANDOVER IN A PACKET-BASED TELECOMMUNICATIONS NETWORK AND HANDOVER METHOD

FIELD OF THE INVENTION

The invention relates to connection-oriented packet-based telecommunications networks, such as ATM (Asynchronous Transfer Mode), and particularly to avoiding packet loss at handovers in such networks.

BACKGROUND OF THE INVENTION

At present, there are two very interesting trends of development in the telecommunication, viz. mobile communication and broadband networks, in which bit rates typically exceed 2 Mbit/s. An example of broadband networks is Broadband Integrated Services Digital Network (B-ISDN), the transfer mode of which is selected to be Asynchronous Transfer Mode (ATM). The ATM is a switching and multiplexing solution particularly relating to a data link layer (i.e. OSI Layer 2, from here on called ATM layer). ATM enables an implementation of a connection-oriented packet network in the B-ISDN networks.

In ATM data transfer, the end user's data traffic is carried from a source to a destination by means of virtual connections. Data is transferred over switches of the network in standard-size packets of 53 bytes, the packets being called ATM cells. The structure of an ATM cell is illustrated in FIG. 1. An ATM cell contains a header of 5 octets and an information field of 48 octets containing actual payload. The main object of the header is to identify a connection number for a sequence of cells, forming a virtual channel for a specific call. A physical layer (i.e. OSI Layer 1) may comprise several virtual paths, which are multiplexed in the ATM layer. The virtual paths are identified by means of a VPI (Virtual Path Identifier). Each virtual path may comprise a number of virtual channels, which are identified by a VCI (Virtual Channel Identifier). The header contains also other fields, such as an HEC (Header Error Control), a GFC (Generic Flow Control), a CLP (Cell Loss Priority) and a PT (Payload Type). The ATM cell contains indirectly an information on the receiver's address, each cell thus being an independent data transfer unit. The number of cells transferred in a time unit is proportional to the user's band-width requirements.

The ATM is a connection-oriented traffic technique, but because there is no connection before it is established, a connection establishment request shall be routed from a source through the ATM network to a destination approximately in the same way as packets are routed in packet-switched networks. After the connection has been established, the cells travel along the same virtual path during the connection.

A third trend of development is to introduce a wireless data transfer (wireless ATM) and mobility into the ATM networks (wireless ATM). The present B-ISDN and ATM standards do not support as such the additional features required by wireless communication, but different solutions to implement for instance mobility management in connection with wireless ATM have been presented already. The aim has been to add wireless data transfer and mobility to the ATM network without significant changes in the existing ATM standards and networks. Such solutions have been presented in the applicant's copending Finnish Patent Applications 971178 and 970602, for example.

In PLMNs (Public Land Mobile Network), radio interfaces have conventionally been narrowband interfaces. The transmission systems of mobile networks have conventionally been implemented by circuit-switched connections in a star or tree network configuration. In order to increase the capacity and flexibility of the transmission systems, a use of different broadband packet-switched transfer systems or ATM technique in mobile networks has also been proposed, for instance in WO 9400959, EP 0366342 and EP 0426269. A possible future trend of development is mobile systems having a broadband radio interface. Then a broadband transmission system of the mobile system is also needed, while a potential alternative is ATM technique.

In mobile networks and in a wireless ATM network, a terminal does not have any fixed access point to the network, but the terminal and the access point may move in the network. When a virtual connection has been routed to the terminal through the ATM network, the routing must also be changed or extended from an old access point (a base station, for example) to a new one. This procedure is called handover or handoff. In a hard handover, the data transfer is interrupted, when the connection is connected from one access point to another. In a soft handover, the continuation of the data transfer is secured by the terminal having a connection both with the old and the new AP (Access Point) simultaneously during the handover.

In an ATM network, and generally in a packet-based telecommunications network, a loss of an ATM cell (packet) reduces significantly the efficiency of the connection. If one single ATM cell is lost (during handover, for instance), it may be necessary to retransmit a whole PDU (Protocol Data Unit) of higher level protocol, i.e. a plurality of ATM cells. This reduces the efficiency of the connection, and for this reason, cell losses have to be avoided. A change in cell order during a connection also causes an error situation at reception and starts a retransmission of the cells. Therefore, it should also be secured that the order of the cells does not change during handover. In general, this requires a buffering of cells always when an active connection breaks for whatever reason. Some reasons for cell buffering in a wireless ATM network are described below.

Traffic from an MT (Mobile Terminal) to an AP (uplink direction) and further to the network must be buffered at least in the MT, when the radio leg of the connection is broken. This may happen during a hard handover or a fading, for instance. A buffering of uplink traffic on the network side may be necessary during a path optimization process.

In downlink direction, there are several alternatives to implement cell buffering. The access point shall buffer the downlink cells for instance for sudden radio link interruptions, congestion and retransmission. During handover, the connection breaks approximately for the time needed for establishing a new radio connection and for releasing an old one. The buffering required by handover may typically be carried out either at an old access point AP or in an ATM switch. Buffering at the old access point AP is simple, because the AP needs a buffering of some kind in any case. Buffering relating to handover is a new function in the ATM switch, besides which, some of the cells still have to be buffered at the old AP.

In both above alternatives of downlink cell buffering, the old access point AP may comprise buffered cells, which have not yet been sent over the radio path. After a handover to a new access point AP, these unsent cells should be transmitted forward to the new AP without a loss of cells and maintaining the cell sequence in order to avoid a retransmission of a whole PDU.

As a solution to this problem has been presented that there are pre-established (permanent) connections between adjacent access points, over which connections the unsent cells can be transferred from the old AP to the new AP. This approach does not require any significant intelligence at the AP and does therefore not increase the complexity of the AP (base station, for instance). However, this solution is not very dynamic and reserves network resources only for this use.

As another solution to this problem has been presented an "intelligent" access point AP being able to establish a connection to a new AP by itself and to transfer the unsent cells to the new AP. By means of this solution, a better dynamism and utilization of network resources are achieved. However, a drawback is that the necessary additional intelligence increases the complexity of the AP and thus the costs.

BRIEF SUMMARY OF THE INVENTION

The object of the invention is thus a method by which unsent cells can be transferred from an old access point to a new one without reserving network resources unnecessarily and without increasing the complexity of the access point and the price significantly.

The objects of the invention are achieved by means of a method of transferring unsent packets from an old access point to a new access point in a packet-based connection-oriented telecommunications network, in which the access point of a terminal to the network may change during an active connection, the method comprising the steps of: buffering at the old access point the packets which the old access point has not sent to the terminal before change of access point; establishing a connection from the old access point to the new access point; transferring the buffered packets from the old access point to the new access point over said connection. The method is according to the invention characterized in that said step of establishing a connection comprises the steps of: generating a signalling required for said connection establishment in a third network element, which is responsible for controlling the change of access point; tunnelling said signalling to the old access point; transmitting said signalling from the old access point to the new access point.

Another object of the invention is a packet-based connection-oriented communications network, comprising an arrangement for transferring unsent packets from an old access point to a new access point, in which arrangement the access point of a terminal to the network changes during an active connection, the arrangement comprising: means for buffering at the old access point the packets which the old access point has not sent to the terminal before change of access point; means for establishing a connection from the old access point to the new access point; means for transferring the buffered packets from the old access point to the new access point over said connection. The network is according to the invention characterized in that said means for establishing a connection comprise means for generating a signalling required for said connection establishment in a third network element, which is responsible for controlling the change of access point; means for tunnelling said signalling to the old access point; means for transmitting said signalling from the old access point to the new access point.

Still another object of the invention is a handover method for handing a terminal over from an old access point to a new access point during an active connection in a packet-based connection-oriented communications network, the method comprising the steps of: establishing a connection between the terminal and the new access point; buffering at the old access point the packets which the old access point has not sent to the terminal before the change of access point; routing an extension from the old access point to the new access point; transferring the buffered packets from the old access point to the new access point over said extension. The method is according to the invention characterized in that said step of routing the extension comprises the steps of: generating a signalling required for the routing in a third network element, which is responsible for controlling the change of access point; tunnelling said signalling to the old access point; transmitting said signalling from the old access point to the new access point.

In the invention, a connection from an old access point to a new one is established dynamically, when it is required. However, instead of being controlled by the old access point, the connection establishment is controlled by a third network element, which is responsible for controlling the change of access point anyway. This third network element is typically a switch or a controlling element of a mobile network, which element already comprises the "intelligence" required for connection establishment. The third network element generates a necessary signalling and in a way "tunnels" this signalling to the old access point, which transmits the signalling forward without interpreting it. Thus the old access point can be made to send signalling messages and to establish a connection without needing any additional intelligence. The third network element controlling the change of access point knows the new access point and is thus able to address the signalling correctly. Tunnelling may comprise, for instance, an encapsulation of an original signalling message containing the address of the actual destination into a packet provided with the address of the old access point and sent to the old access point. The old access point decapsulates the signalling message from the packet and transmits the signalling message forward on the basis of the actual destination address. A signalling response possibly sent from the new access point is addressed to the third network element and transmitted automatically over the old access point. After the connection has been established, the old access point sends the buffered unsent packets to the new access point, in response to a command sent by the third network element, for instance. Then the third network element can release the connection in the same way as described above, if it is not needed any longer. In another embodiment of the invention, the connection establishment according to the invention is used for carrying out a PE (Path Extension) handover. The PE handover extends an existing connection from the old access point to the new access point on the principle described above. In the PE handover, the connection established is not released, however, after the buffered packets have been sent to the new access point.

By means of the invention, the complexity of the access point (a base station, for instance) can be kept minimal, which makes the price more cost effective. On the other hand, the intelligence required in the third network element is already available, and therefore, the invention requires only some new functionality there. A connection can be established dynamically, by which a permanent reservation of network resources is avoided.

BRIEF DESCRIPTION OF THE FIGURES

The invention is now described in more detail by means of preferred embodiments with reference to the attached drawings, in which.

DETAILED DESCRIPTION OF THE INVENTION

The present invention is suitable for being used in all connection-oriented packet-based telecommunications networks, in which the access point of a terminal to the network may change as a consequence of the terminal moving during an active connection. Such telecommunications networks are for instance wireless packet networks and mobile networks, using a connection-oriented packet-based network as a transmission network between base stations and controlling network elements. The primary application area of the invention is in ATM networks, wireless ATM networks in particular, and mobile networks using ATM technique in transmission networks.

Figure 1:
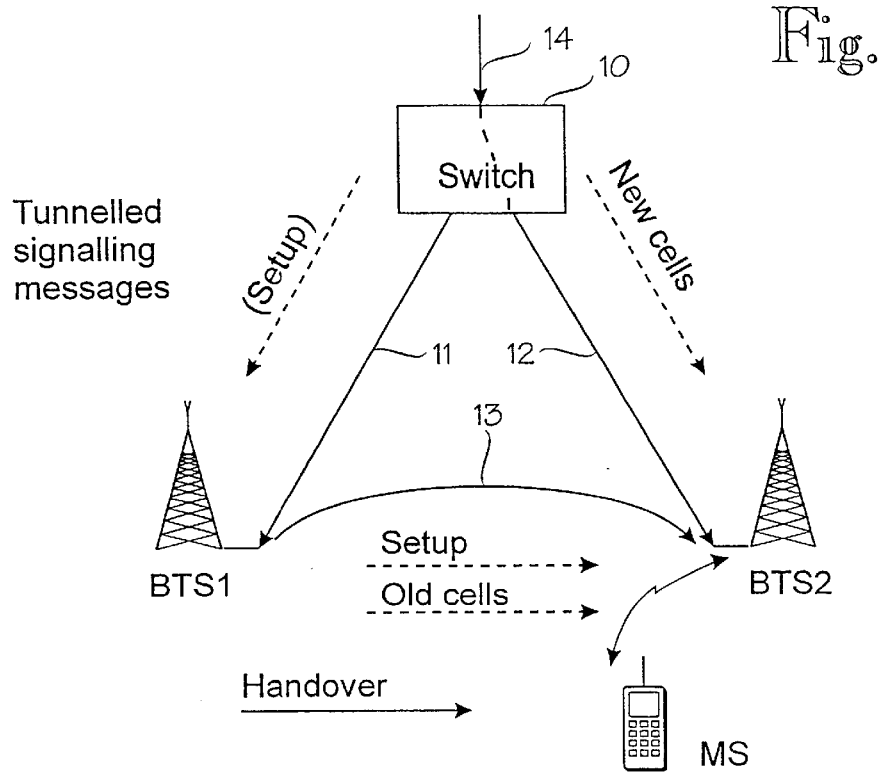
FIG. 1 illustrates an establishment of a connection according to the invention in a "make-break" handover in a wireless ATM network.

With reference to FIG. 1, a simple example is described, which illustrate how unsent ATM cells buffered at an old access point are transferred according to the invention to a new access point in a make-break handover in a wireless ATM network. Two base stations BTS1 and BTS2, i.e. access points, are connected to an ATM switch 10. Initially, it is assumed that a mobile station MS has a radio connection with the base station BTS1, and a virtual ATM connection 11 between the base station BTS1 and the ATM switch 10, and further, a virtual connection 14 over the ATM switch and the ATM network to another party. ATM cells are sent in downlink direction from the switch 10 to the base station BTS1, where they are buffered before they are sent over the radio path to the mobile station MS. An ATM layer and a physical layer MAC (Medium Access Control) preferably have a common cell buffer. It is assumed that the radio connection between the MS and BTS1 weakens so much that the MS is transferred by handover to a new base station BTS2. It is of no significance for the invention, what the criterion for the handover is or whether the mobile station MS or some network element, such as the switch 10, makes the decision on the handover. In the example of FIG. 1, the switch 10 controls, however, at least the reestablishment of the connections on the network side. In a handover, a new radio connection is established between the MS and the new base station BTS1. In addition, a new virtual ATM connection 12 is established between the switch 10 and the new base station BTS2 in the make-break handover of FIG. 1. The switch 10 switches a connection 13 to the new connection 12 in such a way that new cells coming from the other party are sent to the base station BTS2, where they are buffered, instead of being sent to the base station BTS1.

It is further assumed that the buffer of the old base station BTS1 contains cells which the BTS1 has not had time to send over the radio path to the mobile station MS before the handover. These "old" cells should be transferred to the new base station BTS2 and sent over the radio path to the MS before sending "new" cells received over the connection 12. In this way, loss of cells or change of cell order and thus retransmissions are avoided.

According to the invention, the switch 10 controls the establishment of the extension connection 13 between the old base station BTS1 and the new base station BTS2. To be precise, the switch 10 creates signalling messages SETUP required for connection establishment and having an end point address BTS2. The switch 10 has participated in the handover, and therefore, it knows the new base station BTS2. The switch 10 "tunnels" the signalling messages over the connection 11 to the old base station BTS1, from where they are then sent over a signalling connection to the base station BTS2 on the basis of the end point address. Tunnelling may mean an encapsulation of the end point address into a message, which is routed through an intermediate address, called "tunnel" address. In this case, the intermediate address is BTS1. After the signalling has been tunnelled to the intermediate address BTS1, a decapsulation is performed, i.e. the signalling message is transmitted by the BTS1 forward by using the actual end address. In this way, a similar signalling is provided as if it were provided and sent by the BTS1 independently. By means of the invention, the BTS1 does not need to have the intelligence required for connection establishment. As a result of the connection establishment signalling sent by BTS1, a temporary virtual connection 3 is established between the BTS1 and BTS2. Response signalling from the base station BTS2 is transmitted via the base station BTS1 to the switch 10. In a preferred embodiment of the invention, the switch 10 then commands the base station BTS1 to send the old cells of the buffer to the new base station BTS2 over the connection 13. The BTS2 sends the cells over the radio path to the mobile station MS and starts then sending buffered new cells. After this, the connections 11 and 13 are unnecessary and they can be released. The release of the connection 13 can be performed from the switch 13 by means of the same tunnelling solution as the establishment. In other words, the switch 10 creates a release message and tunnels it to the base station BTS1, which then transmits the release message to the end point address BTS2. Upon releasing the connection 13, the connection 11 can be released in a normal way.

It shall be noted that it is not essential for the invention which type of tunnelling technique is used. For the invention, it is only essential that signalling messages created by the switch 10 can be transferred by tunnelling to the base station BTS1 to be sent forward, as if BTS1 had created and sent the messages itself. Otherwise, the signalling protocol used is a normal ATM signalling protocol. A tunnelling technique is described in (AF96-1699) Potter, Gilmurray (ORL), 1996, "Tunnelled Signalling for the Support of the Mobile ATM, ATM Forum Contribution 96-1699", incorporated herein with its cross-references. ATM signalling and tunnelling are described in "ATM User-Network-interface Specification", version 3.1, ATM Forum, 1994.

Figure 2:
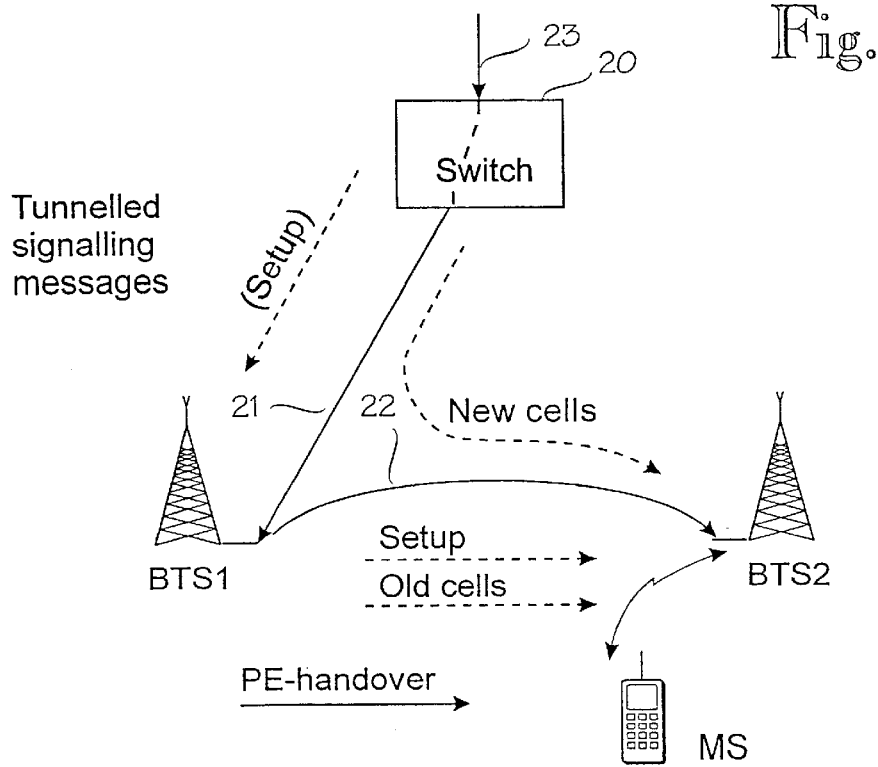
FIG. 2 illustrates an establishment of a connection according to the invention in a path extension handover in a wireless ATM network.

Referring to FIG. 2, a simple example is described, which illustrates how unsent ATM cells buffered at an old access point are transferred according to the invention to a new access point in a Path Extension (PE) handover in a wireless ATM network. Two base stations BTS1 and BTS2, i.e. access points, are connected to an ATM switch 20. Initially, it is assumed that the mobile station MS has a radio connection with the base station BTS1 and a virtual ATM connection 21 between the base station BTS1 and the ATM switch 20, and a further virtual connection 23 through the ATM switch 20 and the ATM network to another party. ATM cells are sent in downlink direction from the switch 20 to the base station BTS1, where they are buffered before being sent over the radio path to the mobile station MS. It is assumed that the radio connection between the MS and the BTS1 weakens so much that the MS is transferred by handover to the new base station BTS2 in the same way as in FIG. 1. In the handover, a new radio connection is established between the MS and the new base station BTS2. In the PE handover of FIG. 2, a new virtual ATM connection 22 is additionally established between the old base station BTS1 and the new base station BTS2. The unsent cells remained in the buffer of the base station BTS1 and the new cells coming from the other party are transmitted over the connection 22 to the base station BTS2.

According to the invention, the switch 20 controls the establishment of an extension 22 between the old base station BTS1 and the new base station BTS2 on the same tunnelling principle as in FIG. 1. To be precise, the switch 20 creates the signalling messages SETUP needed for connection establishment and tunnels them over the connection 21 to the old base station BTS1, which sends the signalling messages over a signalling connection to the base station BTS2. As a result of the connection establishment signalling sent by the BTS1, a temporary virtual connection 22 is established between the BTS1 and BTS2. In the preferred embodiment of the invention, the switch 10 then commands the base station BTS1 to send the old cells in the buffer-over the connection 13 to the new base station BTS2. The BTS2 sends them over the radio path to the mobile station MS and then starts sending buffered new cells. In PE handover, the connections 21 and 22, which are needed also after the buffer of the base station BTS1 has been emptied, are not released as in FIG. 1.

The invention thus enables an implementation of a PE handover without requiring any additional intelligence in the base station for establishing a connection.

The switch 10 or 20 described above may be any network element provided with an ATM switch function, such as a conventional switch of an ATM network, a switch of a wireless ATM network, or a controlling network element of another telecommunications network, provided with an ATM switch function. Examples of implementing a wireless ATM network and a mobile network using ATM technique are described e.g. in Finnish Patent Applications 971178 and 970602, incorporated herein as reference.

The figures and the description relating to them are only intended to illustrate the present invention. Accordingly, the invention and its embodiments are not restricted to the above examples, but they can vary within the scope of the claims.

What is claimed is:

1. A method of transferring unsent packets from an old access point to a new access point in a packet-based connection-oriented telecommunications network, in which the access point of a terminal to the network may change during an active connection, the method comprising:
   buffering at the old access point the packets which the old access point has not sent to the terminal before change of access point;
   establishing a connection from the old access point to the new access point; and
   transferring the buffered packets from the old access point to the new access point over said connection;
   said establishing a connection further comprising:
      generating a connection establishment signaling required for said connection establishment in a third network element, which is responsible for controlling the change of access point,
      tunneling said generated connection establishment signaling to the old access point, and
      transmitting said generated connection establishment signaling from the old access point to the new access point.

2. A method according to claim 1, wherein the tunneling comprises
   encapsulating in the third network element a signaling message provided with an address of the actual destination into a packet provided with the address of the old access point;
   sending the encapsulated signaling message to the old access point;
   decapsulating the signaling message at the old access point; and
   transmitting the signaling message forward on the basis of the address of the actual destination.

3. A method according to claim 1 or 2, further comprising
   creating a connection release message in the third network element, after said buffered packets have been transferred from the old access point to the new access point;
   tunneling the connection release message to the old access point; and
   transmitting the connection release message from the old access point to the new access point.

4. A method according to claim 1 or 2, further comprising
   using said connection as an extension of a path extension handover from the old access point to the new access point.

5. A method according to claim 1 or 2, wherein the telecommunications network is an ATM-based network and the packets are ATM cells.

6. A packet-based connection-oriented communications network, comprising an arrangement for transferring unsent packets from an old access point to a new access point, in which arrangement the access point of a terminal to the network changes during an active connection, the arrangement comprising:
   means for buffering at the old access point the packets which the old access point has not sent to the terminal before change of access point; and
   means for establishing a connection from the old access point to the new access point;
   means for transferring the buffered packets from the old access point to the new access point over said connection, wherein said means for establishing a connection comprises:
      means for generating a connection establishment signaling required for said connection establishment in a third network element, which is responsible for controlling the change of access point,
      means for tunneling said generated connection establishment signaling to the old access point, and
      means for transmitting said generated connection establishment signaling from the old access point to the new access point.

7. A network according to claim 6, wherein said tunneling means comprise
   means in the third network element for encapsulating a signaling message provided with the address of the actual destination into a packet provided with the address of the old access point and for sending the encapsulated signaling message to the old access point; and
   means for decapsulating the signaling message at the old access point and for restoring the original signaling message to be transmitted forward on the basis of the actual destination address.

8. A network according to claim 6 or 7, wherein the arrangement further comprises
   means for creating a connection release message in the third network element, after said buffered packets have been transferred from the old access point to the new access point; and means for tunneling the connection release message to the old access point and for transmitting the connection release message from the old access point to the new access point.

9. A network according to claim 6 or 7, wherein said connection is an extension of a path extension handover from the old access point to the new access point.

10. A network according to claim 6 or 7, wherein the telecommunications network is an ATM-based network and the packets are ATM cells.

11. A network according to claim 10, wherein the telecommunications network is a wireless ATM network comprising mobile stations and at least one ATM switch connected to base stations, and wherein said third network element is an ATM switch and the access points are base stations.

12. A network according to claim 10, wherein the telecommunications network is a mobile network, comprising a plurality of mobile stations and base stations, at least one controlling element of a mobile network and an ATM transmission network interconnecting said controlling element of the mobile network and the base stations, and wherein said third network element is at least one of said controlling element of the mobile network and an ATM switch of the ATM transmission network and the access points are base stations.

13. A handover method for handing a terminal over from an old access point to a new access point during an active connection in a packet-based connection-oriented telecommunications network, the method comprising:

establishing a connection between the terminal and the new access point;

buffering at the old access point the packets which the old access point has not sent to the terminal before the change of access point;

routing an extension from the old access point to the new access point; and transferring the buffered packets from the old access point to the new access point over said extension, said routing the extension comprises:

generating a routing signaling required for the routing in a third network element, which is responsible for controlling the change of access point;

tunneling said generated routing signaling to the old access point; and transmitting said generated routing signaling from the old access point to the new access point.

14. A method according to claim 13, wherein the tunneling comprises encapsulating, in the third network element, a signaling message provided with the address of the actual destination into a packet provided with the address of the old access point;

sending the encapsulated signaling message to the old access point;

decapsulating the signaling message at the old access point; and transmitting the signaling message forward on the basis of the actual destination address.

15. A method according to claim 13 or 14, wherein the communications network is an ATM-based network and the packets are ATM cells.

* * * * *